US011604854B2

(12) United States Patent
Craske (10) Patent No.: US 11,604,854 B2
(45) Date of Patent: Mar. 14, 2023

(54) APPARATUS AND METHOD FOR PERFORMING LINEAR INTERPOLATION

(71) Applicant: Arm Limited, Cambridge (GB)

(72) Inventor: Simon John Craske, Cambridge (GB)

(73) Assignee: Arm Limited, Cambridge (GB)

( * ) Notice: Subject to any disclaimer, the term of this patent is extended or adjusted under 35 U.S.C. 154(b) by 323 days.

(21) Appl. No.: 16/930,650

(22) Filed: Jul. 16, 2020

(65) Prior Publication Data

US 2022/0019642 A1    Jan. 20, 2022

(51) Int. Cl.
*G06F 17/17* (2006.01)
*G06F 7/544* (2006.01)

(52) U.S. Cl.
CPC ............ *G06F 17/17* (2013.01); *G06F 7/5443* (2013.01)

(58) Field of Classification Search
CPC . G06F 7/38; G06F 7/523; G06F 7/544; G06F 7/5443; G06F 7/57; G06F 7/575; G06F 17/17; G06F 5/01
See application file for complete search history.

(56) References Cited

U.S. PATENT DOCUMENTS

| 5,113,362 | A | * | 5/1992 | Harston | G06F 17/17 708/290 |
| 5,148,381 | A | * | 9/1992 | Sprague | G06F 7/544 708/290 |
| 7,840,623 | B2 | * | 11/2010 | Tonomura | G06F 7/544 708/290 |
| 8,037,119 | B1 | * | 10/2011 | Oberman | G06F 7/5324 708/503 |

* cited by examiner

*Primary Examiner* — Emily E Larocque
(74) *Attorney, Agent, or Firm* — Nixon & Vanderhye P.C.

(57) ABSTRACT

A multiplier array for implementing a multiply-accumulate operation has a plurality of rows, where each row comprises multiplexer circuitry and adder circuitry, the multiplexer circuitry selecting, in dependence on a control input, one of a first multiplexer input value and a second multiplexer input value to provide as a first adder input value to the adder circuitry. In each row other than an initial row, the adder circuitry also receives as a second adder input value at least a portion of a result value produced in a preceding row. In a multiplication mode, the multiplier array implements the multiply-accumulate operation, and in a linear interpolation mode, the multiplier array implements a linear interpolation operation between a lower limit value and an upper limit value based on a weighting value.

16 Claims, 7 Drawing Sheets

WORKED EXAMPLE (FOR FIG 6 ARRAY)

MULTIPLY - ACCUMULATE    (NO ACCUMULATE ∴ C=0)

```
    MULTIPLIER   (B)      1  0  1  0           (i.e. 10)
    MULTIPLICAND (F)      1  1  0  0           (i.e. 12)
                         ─────────────
                          0  0  0  0       Row 0    F[0]=0
                       0  0  0  0          Row 1    F[1]=0
                    1  0  1  0              Row 2    F[2]=1
                 1  0  1  0                  Row 3    F[3]=1
                ─────────────────
                 0  1  1  1  1  0  0  0         (i.e. 120)
```

FIG. 7A

LINEAR INTERPOLATION

```
    LOWER LIMIT  (C)      0  0  0  1
    LOWER LIMIT  (A)      0  0  0  1           (i.e. 1)
    UPPER LIMIT  (B)      1  1  0  0           (i.e. 12)
    WEIGHTING VALUE (F)   1  1  0  0           (i.e. 12/16th)

A+C ⇒       0  0  1  0       Row 0    F[0]=0
                       0  0  0  1          Row 1    F[1]=0
                    1  1  0  0              Row 2    F[2]=1
                 1  1  0  0                  Row 3    F[3]=1
                ─────────────────
                 1  0  0  1  0  1  0  0
                          └──► i.e. 9.25 in Q4.4 format
```

APPARATUS AND METHOD FOR PERFORMING LINEAR INTERPOLATION

BACKGROUND

The present technique relates to the performance of linear interpolation operations.

There are many situations where it can be useful to provide circuitry to perform linear interpolation operations within an apparatus. For example, in some situations it may be required to perform a complex function on an input value in order to produce an output value. Rather than providing dedicated circuitry to perform that complex function, an alternative approach sometimes adopted is to provide a lookup table, which may for example be resident within the memory of the system, and which provides, for a number of different possible input values, the corresponding output value that would be generated if the complex function were applied to that input value. When a given input value is received, a lookup may be performed within that lookup table to find stored input values in the lookup table that are either side of the given input value, to retrieve the result values for those identified input values in the table, and to then perform a linear interpolation operation in order to estimate the output value for the given input value.

Such linear interpolation techniques can be useful in a variety of systems, and is for instance a commonly used technique in control systems, as for example may be used within the automotive industry.

However, whilst the use of such interpolation techniques can avoid the need to provide dedicated circuitry to perform the earlier-mentioned complex function, it is desirable to provide an efficient circuit for performing the linear interpolation operation.

SUMMARY

In one example arrangement, there is provided an apparatus comprising: a multiplier array to implement a multiply accumulate operation in order to multiply together a multiplier value and a multiplicand value, and add an accumulate value; the multiplier array comprising a plurality of rows, each row comprising multiplexer circuitry and adder circuitry, with the multiplexer circuitry being arranged to select, in dependence on a control input, one of a first multiplexer input value and a second multiplexer input value to provide as a first adder input value to the adder circuitry, in each row other than an initial row the adder circuitry further being arranged to receive as a second adder input value at least a portion of a result value produced by the adder circuitry in a preceding row of the multiplier array; and mode select circuitry to change the mode of operation of the apparatus between a multiplication mode where the multiplier array implements the multiply accumulate operation and a linear interpolation mode where the multiplier array is used to implement a linear interpolation operation between a lower limit input value and an upper limit input value based on a weighting value; wherein: when in the multiplication mode, each row of the multiplier array is arranged such that the control input for the multiplexer circuitry of that row is provided by an associated bit of the multiplicand value selected for that row, the first multiplexer input value is set to 0, and the second multiplexer input value is set to the multiplier value; when in the linear interpolation mode, each row of the multiplier array is arranged such that the control input for the multiplexer circuitry of that row is provided by an associated bit of the weighting value selected for that row, one of the first multiplexer input value and the second multiplexer input value is set to the lower limit input value, and other of the first multiplexer input value and the second multiplexer input value is set to the upper limit input value.

In another example arrangement, there is provided a method for performing linear interpolation within an apparatus, comprising: providing a multiplier array to implement a multiply accumulate operation in order to multiply together a multiplier value and a multiplicand value, and add an accumulate value; arranging the multiplier array to comprise a plurality of rows, each row comprising multiplexer circuitry and adder circuitry, with the multiplexer circuitry being arranged to select, in dependence on a control input, one of a first multiplexer input value and a second multiplexer input value to provide as a first adder input value to the adder circuitry, in each row other than an initial row the adder circuitry further being arranged to receive as a second adder input value at least a portion of a result value produced by the adder circuitry in a preceding row of the multiplier array; changing the mode of operation of the apparatus between a multiplication mode where the multiplier array implements the multiply accumulate operation and a linear interpolation mode where the multiplier array is used to implement a linear interpolation operation between a lower limit input value and an upper limit input value based on a weighting value; when in the multiplication mode, arranging each row of the multiplier array such that the control input for the multiplexer circuitry of that row is provided by an associated bit of the multiplicand value selected for that row, the first multiplexer input value is set to 0, and the second multiplexer input value is set to the multiplier value; and when in the linear interpolation mode, arranging each row of the multiplier array such that the control input for the multiplexer circuitry of that row is provided by an associated bit of the weighting value selected for that row, one of the first multiplexer input value and the second multiplexer input value is set to the lower limit input value, and other of the first multiplexer input value and the second multiplexer input value is set to the upper limit input value.

In a still further example arrangement, there is provided an apparatus comprising: multiplier array means for implementing a multiply accumulate operation in order to multiply together a multiplier value and a multiplicand value, and add an accumulate value; the multiplier array means comprising a plurality of rows, each row comprising multiplexer means and adder means, with the multiplexer means for selecting, in dependence on a control input, one of a first multiplexer input value and a second multiplexer input value to provide as a first adder input value to the adder means, in each row other than an initial row the adder means further being arranged to receive as a second adder input value at least a portion of a result value produced by the adder means in a preceding row of the multiplier array means; and mode select means for changing the mode of operation of the apparatus between a multiplication mode where the multiplier array means implements the multiply accumulate operation and a linear interpolation mode where the multiplier array means is used to implement a linear interpolation operation between a lower limit input value and an upper limit input value based on a weighting value; wherein: when in the multiplication mode, each row of the multiplier array means is arranged such that the control input for the multiplexer means of that row is provided by an associated bit of the multiplicand value selected for that row, the first multiplexer input value is set to 0, and the second multiplexer input value is set to the multiplier value; when in the linear interpolation mode, each row of the multiplier array means is arranged such that the control input for the multiplexer means of that row is provided by an associated bit of the weighting value selected for that row, one of the first multiplexer input value and the second multiplexer input value is set to the lower limit input value, and other of the first multiplexer input value and the second multiplexer input value is set to the upper limit input value.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

As discussed earlier, it would be desirable to provide an efficient mechanism for an apparatus to perform a linear interpolation operation. In accordance with the techniques described herein, it has been found that a multiplier array used to implement a multiply-accumulate operation can be organised in a particular way so that it can readily support the performance of linear interpolation operations, thus avoiding the requirement to provide additional circuitry to support the performance of such linear interpolation operations. In many types of apparatus, for example central processing unit (CPU) hardware, there will typically be provided a multiplier array for performing multiply-accumulate operations, and hence by arranging the multiplier array in the manner described herein, it is possible to additionally support linear interpolation operations without needing to provide dedicated circuitry for that purpose, thus leading to a particularly area efficient and low cost solution.

In accordance with one example implementation an apparatus is provided with a multiplier array to implement a multiply-accumulate operation in order to multiply together a multiplier value and multiplicand value, and add an accumulate value. The multiplier array comprises a plurality of rows, and each row is arranged to provide multiplexer circuitry and adder circuitry. In typical multiplier array designs that are designed solely to seek to optimise the performance of multiply-accumulate operations, it is known to seek to avoid the presence of such multiplexer circuitry, for example by reorganising the multiplier array such that the multiplexers are replaced with AND gates. However, the inventor of the present application realised that by retaining such multiplexer circuitry, it is possible to support not only multiply-accumulate operations, but also to support linear interpolation operations using the components of the multiplier array.

In accordance with the techniques described herein, the multiplexer circuitry is arranged to select, in dependence on a control input, one of a first multiplexer input value and a second multiplexer input value to provide as a first adder input value to the adder circuitry. In each row other than an initial row, the adder circuitry is further arranged to receive as a second adder input at least a portion of a result value produced by the adder circuitry in a preceding row of the multiplier array.

Further, the apparatus is provided with mode select circuitry to change the mode of operation of the apparatus between a multiplication mode where the multiplier array implements the multiply-accumulate operation, and a linear interpolation mode where the multiplier array is used to implement a linear interpolation operation between a lower limit input value and an upper limit input value based on a weighting value.

When in the multiplication mode, each row of the multiplier array is arranged such that the control input for the multiplexer circuitry of that row is provided by an associated bit of the multiplicand value selected for that row, the first multiplexer input value is set to zero and the second multiplexer input value is set to the multiplier value.

However, when in the linear interpolation mode, each row of the multiplier array is instead arranged such that the control input for the multiplexer circuitry of that row is provided by an associated bit of the weighting value selected for that row. Further, one of the first multiplexer input value and the second multiplexer input value is set to the lower limit input value, whilst the other of the first multiplexer input value and the second multiplexer input value is set to the upper limit input value.

Hence, by controlling the inputs to the multiplexer circuitry in each row of the multiplier array, and by changing the control input used to drive the multiplexer circuitry in each row, it is possible to switch the operation performed by the multiplier array between a multiply-accumulate operation and a linear interpolation operation.

In one example implementation, the multiplier array has an accumulate input that is set to the accumulate value when the mode of operation is the multiplication mode, and that is set to the lower limit input value when the mode of operation is the linear interpolation mode. It should be noted that when in the multiplication mode of operation, there is no requirement to perform an accumulate operation, and instead a simple multiply operation can be achieved by setting the accumulate value to zero. When in the linear interpolation mode, the use of the accumulate input enables an additional instance of the lower limit input value to be readily input into the multiplier array. This additional instance of the lower limit value does need to be added to the result that would otherwise be produced by the various multiplexer and adder circuits within the multiplier array, and by providing that additional instance of the lower limit value as the accumulate input, this avoids the need to perform any further addition on the output from the multiplier array.

In one example implementation, the accumulate input is used as a second adder input value to the adder circuitry in the initial row, and accordingly the use of the accumulate input can be readily accommodated within the multiplier array without needing to incorporate any additional components within the multiplier array.

Whilst the weighting value could be expressed in a variety of ways, and hence for example could be expressed relative to the lower limit input value or the upper limit input value, in one example implementation the weighting value is expressed relative to the lower limit input value. In such an implementation, within each row of the multiplier array, the first multiplexer input value is set to the lower limit input value, and the second multiplexer input value is set to the upper limit input value.

It will be appreciated that the result output by the multiplier array will have a larger number of bits than the input values provided to the multiplier array. For example, if each of a multiplier value and a multiplicand value has M bits, then the result output from the multiplier array will typically have 2M bits. This is also the case when the multiplier array is used in the linear interpolation mode, and the final output from the multiplier array will need to be interpreted accordingly when determining the linear interpolation result represented by that output. Purely by way of illustrative example, if each of the lower limit input value and upper limit input value comprises four bits, the result output from the multiplier array may comprise eight bits. Considering the Q number format used to represent numbers in a binary fixed point number format, then if the four bit lower limit and upper limit input values are considered to be integers, and hence have the Q 4.0 format, the 8-bit result output from the multiplier array can be considered to have a Q 4.4 result format, hence including four fractional bits of precision.

With an understanding of the format of the output from the multiplier array, the linear interpolation result output by the multiplier array can be used "as is". However, if desired, the apparatus may further comprise result adjustment circuitry that is operable, when the multiplier array is operating in the linear interpolation mode, to perform an adjustment operation on a final result output by the multiplier array in order to produce a linear interpolation result value in a format required for subsequent (also referred to herein as downstream) processing. For example, it may be desired for downstream processing that the linear interpolation result is expressed in the same Q format as the inputs, i.e. Q 4.0 in the specific example discussed above. This can be achieved, for example, by truncating the result from the multiplier array, in the above example by discarding the least significant four bits, or optionally by performing some rounding operation prior to truncation so as to take account of the bit values in the discarded least significant bits of the result.

In one example implementation, the adjustment operation comprises performing a computation equivalent to dividing the final result by $2^x$, where x is the number of rows in the multiplier array. The weighting value will typically be expressed in a form such that the weighting value has the same number of bits as the number or rows in the multiplier array, and hence x may also be considered to represent the number of bits in the weighting value.

In one example implementation, rather than actually performing any division operation, the result adjustment circuitry is instead arranged to comprise right shift circuitry to right shift the final result by x bits in order to drop the least significant x bits of the final result when producing the linear interpolation result. As discussed above, such an approach can be used to produce a linear interpolation result that is in the same format as the lower and upper limit input values.

The multiplier array can be organised in a variety of ways, but in one example implementation, when the multiplier array is operating in the multiplication mode, then in each row other than an initial row the operation of the multiplexer circuitry and adder circuitry implements functionality equivalent to determining whether to add the multiplier value, shifted left by an amount dependent on a row number of that row, to the result value output from the adder circuitry of the previous row, dependent on the associated bit of the multiplicand value selected for that row.

However, there are a number of ways in which the above-mentioned left shift functionality can be implemented. In one example implementation, for a given row, the function of shifting the multiplier value left by an amount dependent on a row number of that given row is achieved by right shifting the result value from the previous row by one bit, outputting the least significant bit of that result value as a bit of a final result of the multiplier array, and using a remaining portion of the result value as the second adder input value for the adder circuitry of the given row. Hence, each row other than a final row of the multiplier array outputs one bit of the final result, with the final row of the multiplier array then outputting all of the remaining bits of the result that have not been output by any of the preceding rows.

When using the multiplier array in the linear interpolation mode, a number of other components can be used to determine the appropriate inputs to provide to the multiplier array. In one example implementation, the apparatus further comprises a lookup table that is used to store, for a given function, a plurality of function input values, and for each function input value a corresponding function result value produced by applying the given function to that function input value. Input determination circuitry can then be arranged, when in the linear interpolation mode, to perform a lookup within the lookup table, based on a specified function input value, to determine a first stored function input value lower than the specified function input value and a second stored function input value higher than the specified function input value. The input determination circuitry then retrieves from the lookup table the corresponding first and second function result values for the first and second stored function input values.

Hence, the first and second stored function input values are those stored function input values either side of the specified function input value, and the corresponding first and second function result values can then be used when performing the above-mentioned linear interpolation operation in order to estimate the function result value for the specified function input value.

In particular, the input determination circuitry is arranged to derive the lower limit input value from the first function result value and the upper limit input value from the second function result value. In one example implementation, the first function result value may be used in its entirety as the lower limit input value and similarly the second function result value may be used in its entirety as the upper limit input value. However, if the number of bits in the result values exceeds the number of bits that can be input as lower limit and upper limit input values into the multiplier array, then a certain subset of the bits in the first and second function result values can be selected to form the lower limit and upper limit input values. For instance, starting from the most significant bit of each of the first and second function result values, and preceding towards the least significant bit, the first bit position reached where the first and second function result values differ can be identified as a most significant fractional bit. That most significant fractional bit, along with all of the remaining bits of each function result value, then form the fractional bits, and the most significant p fractional bits, where p is the number of bits that can be provided in each input value to the multiplier array, can then be selected as the lower limit and upper limit input values.

Further, the input determination circuitry is arranged to derive the weighting value from a comparison of a difference between the specified function input value and the first stored function input value, and a difference between the specified function input value and the second stored function input value. The multiplier array can then be arranged, using as inputs the determined lower limit input value, upper limit input value, and weighting value, to produce a linear interpolation result at the output of the multiplier array that provides an estimate of the function result value that would be produced by applying the given function to the specified function input value.

As mentioned earlier, result adjustment circuitry can be provided if desired, in order to adjust the linear interpolation result so that it is in a format required for subsequent processing. For instance it may be desired that the format of the linear interpolation result value is the same as that used for the input lower limit and upper limit input values. As one example situation where such an adjustment may be appropriate, if there is a common portion of the first and second function result values that was not provided to the multiplier array (for example a certain number of most significant bits of the first and second function result values that is identical in both of those result values), then the result adjustment circuitry may be used to alter the format of the linear interpolation result such that it can then be appended to the common portion of the first and second function result values in order to produce the function result value that would be produced by applying the given function to the specified function input value.

Whilst the weighting value can take a variety of forms, in one example implementation the weighting value is chosen to have a number of bits equal to the number of rows in the multiplier array. If necessary, logic zero padding values may be added in order to extend the weighting value so that it has the same number of bits as the number of rows in the multiplier array.

Whilst the weighting value may in some instances have a different number of bits to the number of bits in the lower limit input value or the upper limit input value, in one example implementation the weighting value is chosen to have a number of bits equal to the number of bits in each of the lower limit input value and the upper limit input value.

The multiplexer circuitry and adder circuitry can be arranged in a variety of ways. However, in one example implementation, within each row, the multiplexer circuitry and adder circuitry comprise separate multiplexer blocks and adder blocks to process individual bits of the first and second multiplexer input values and first and second adder input values.

In one example implementation, when in the multiplier mode the multiplier array is arranged to output a final result which is equal to B×F+C, where B is the multiplier value, F is the multiplicand value, and C is the accumulate value. However, when in the linear interpolation mode the multiplier array is instead arranged to output a final result that, when expressed in integer format, is equal to $2^x \times (A \times (2^x - F)/2^x)) + (B \times F/2^x))$, where A is the lower limit input value, B is the upper limit input value, F is the weighting value, and x is the number of rows in the multiplier array. In one example implementation, since the weighting value is constrained so as to have the same number of bits as there are rows in the multiplier array, the value "x" is also an indication of the number of bits in the weighting value.

As discussed earlier, the final result output by the multiplier array will have a larger number of bits than that present in the lower limit input value or the upper limit input value, and hence can provide a more fine grained linear interpolation result by including certain fractional bits that may or may not be required for downstream processing. As discussed earlier, result adjustment circuitry can be employed, if necessary, to convert the linear interpolation result into a required format for downstream processing, for example by performing a right shift operation to discard any least significant bits that are not required.

Particular examples will now be described with reference to the figures.

Figure 1:
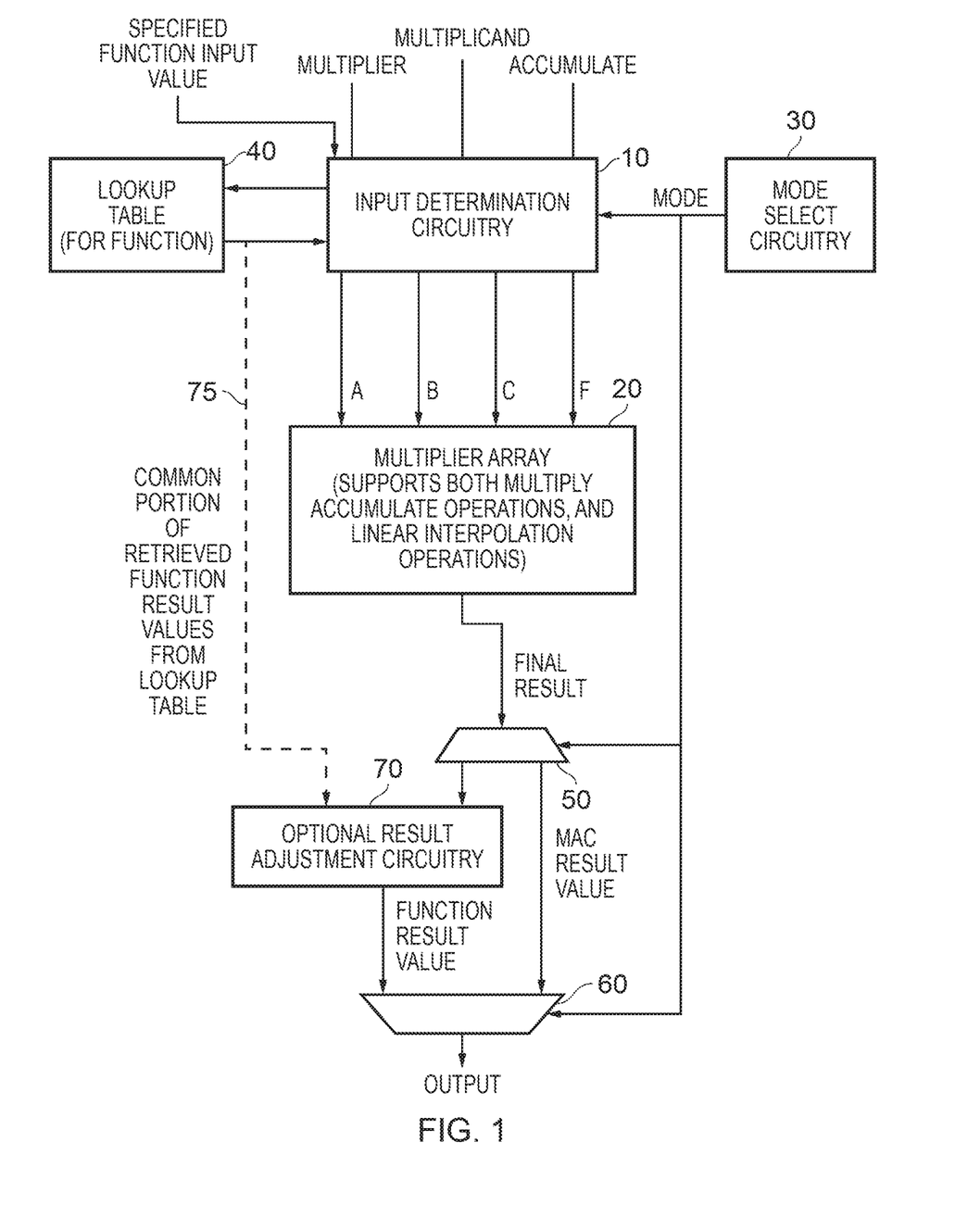
FIG. 1 is a block diagram of an apparatus in accordance with one example arrangement.

FIG. 1 is a block diagram of an apparatus in accordance with one example implementation. A multiplier array 20 is provided that is arranged so that it can support both multiply-accumulate operations and linear interpolation operations. Input determination circuitry 10 is provided so as to control the inputs provided to the multiplier array dependent on whether the apparatus is operating in a multiplication mode where the multiplier array implements a multiply-accumulate operation, or a linear interpolation mode where the multiplier array implements a linear interpolation operation.

Mode select circuitry 30 is provided for outputting a mode control signal to the input determination circuitry to identify the mode of operation of the apparatus, so that the input determination circuitry then chooses the inputs to the multiplier array accordingly. The mode control signal is also provided to the selection circuits 50, 60 that may be provided to support implementations that allow the result output from the multiplier array when in the linear interpolation mode to be subjected to an adjustment operation in order to generate an interpolation result in a desired format. In particular, optional result adjustment circuitry 70 may be provided that can perform an adjustment operation on the final result output by the multiplier array when the apparatus is operating in the linear interpolation mode. As also indicated by the dotted line 75, the optional result adjustment circuitry can in some example implementations facilitate the combining of the output from the multiplier array with a common portion of retrieved function result values from a lookup table 40.

The lookup table 40 is used when the apparatus is operating in the linear interpolation mode. In particular, the lookup table stores a number of input values, and the corresponding output values that would be obtained by applying a particular function to those input values. The function may for example be a complex function, for which it may be difficult, or at least considered too expensive, to provide bespoke circuitry for computing output values for every possible input value to that function. Instead, by providing such a lookup table, when a specified function input value is provided to the input determination circuitry 10, and the apparatus is operating in the linear interpolation mode, the input determination circuitry can perform a lookup operation within the lookup table to identify input values stored therein that are either side of the specified function input value, and then retrieve from the lookup table the function result values for those two identified input values.

The two retrieved function result values can then be used to derive lower limit and upper limit input values to be provided to the multiplier array. In addition, a weighting value can be determined based on the difference between the specified function input value and each of the two identified input values within the lookup table. The lower limit input value, upper limit input value, and weighting value can then be provided by the input determination circuitry 10 to the multiplier array 20 when the apparatus is operating in the linear interpolation mode, whereas when instead the apparatus is operating in the multiply-accumulate mode the input determination circuitry will provide to the multiplier array a multiplier value, a multiplicand value and optionally an accumulate value.

Figure 2:
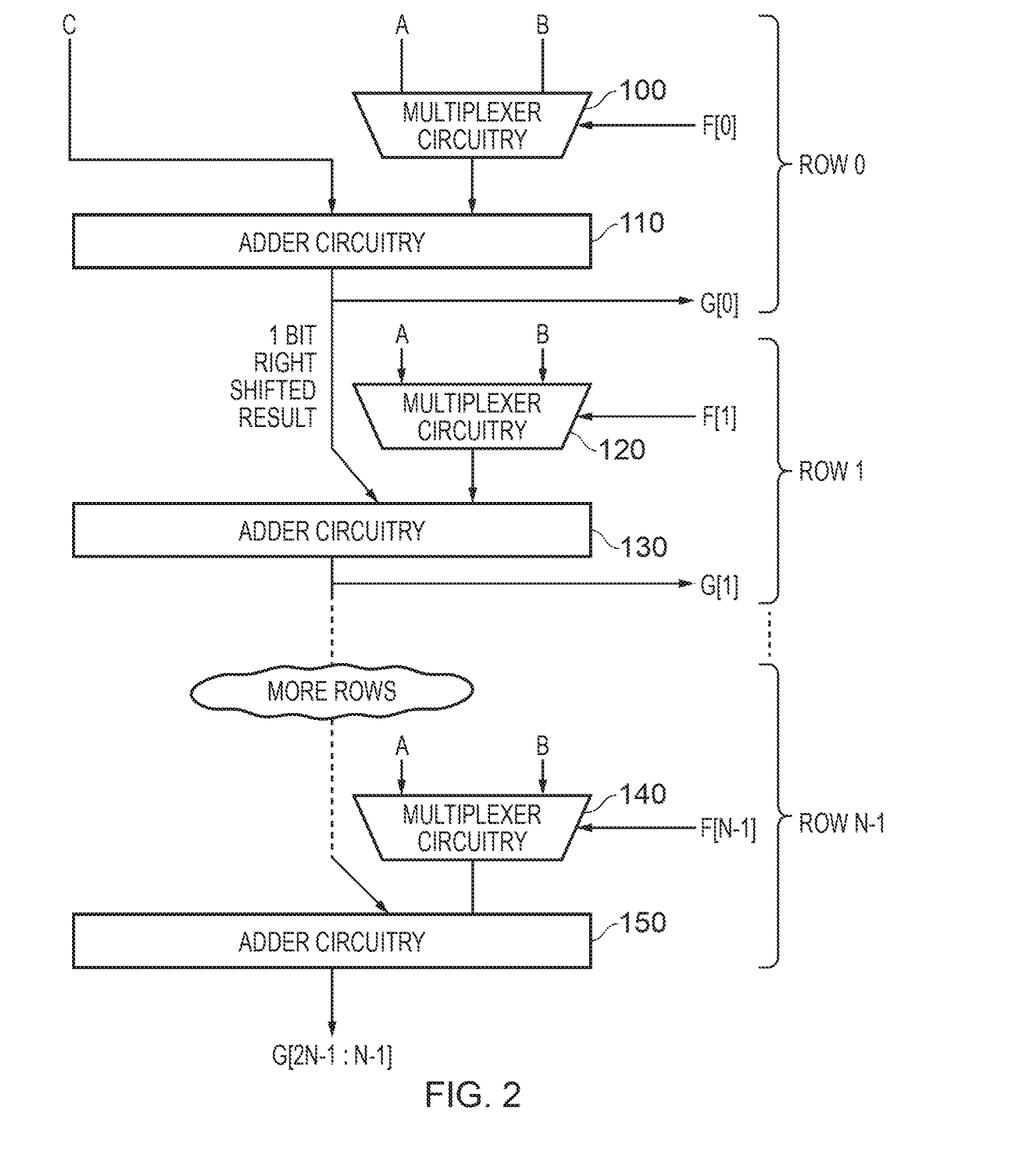
FIG. 2 is a diagram schematically illustrating components provided within each row of the multiplier array of FIG. 1, in accordance with one example arrangement.

As shown in FIG. 1, four inputs are provided to the multiplier array 20, labelled in FIG. 1 as inputs A, B, C and F. FIG. 2 is a diagram illustrating in more detail components provided within each row of the multiplier array, and how the above-mentioned four inputs are provided to those rows. As shown in FIG. 2, each row contains multiplexer circuitry 100, 120, 140 and associated adder circuitry 110, 130, 150. In the example shown there are N rows, elsewhere herein the number of rows also being referred to by the parameter "x". As shown in FIG. 2, each of the multiplexer circuits receives two inputs, namely inputs A and B. Individual bits of the input F are used to control the multiplexer circuitry in each row, bit 0 of the input value F being used to control the multiplexer circuitry 100 in row 0, bit 1 of the input value F being used to control the multiplexer circuitry 120 in row 1, etc.

The output from each multiplexer circuit 100, 120, 140 provides a first input to the associated adder circuitry 110, 130, 150 in the same row. As shown in FIG. 2, the adder circuitry 110 in the first row (row 0) receives as a second input the input value C. For each of the subsequent rows, the second input to the adder circuitry is provided by the output from the adder circuitry in a preceding row. In the particular example shown in FIG. 2, the output from the adder circuitry in a particular row is right shifted by one bit, the least significant bit is output as a bit of the result value G, and the remaining bits are provided as the second input to the adder circuitry in the next row.

Within each row other than the initial row, the operation of the multiplexer circuitry and adder circuitry implements functionality that, when in the multiplication mode of operation, is equivalent to determining whether to add the multiplier value, shifted left by an amount dependent on a row number of that row, to the result value output from the adder circuitry of the previous row, in dependence on the associated bit of a multiplicand value selected for that row. However, as shown in FIG. 2, the function of shifting the multiplier value left by an amount dependent on a row number of a given row is actually achieved by right shifting the result value from the previous row by one bit, outputting the least significant bit of that result value as a bit of the final result for the multiplier array, and using the remaining portion of the result value as the second adder input value for the adder circuitry in the given row.

Figure 3:
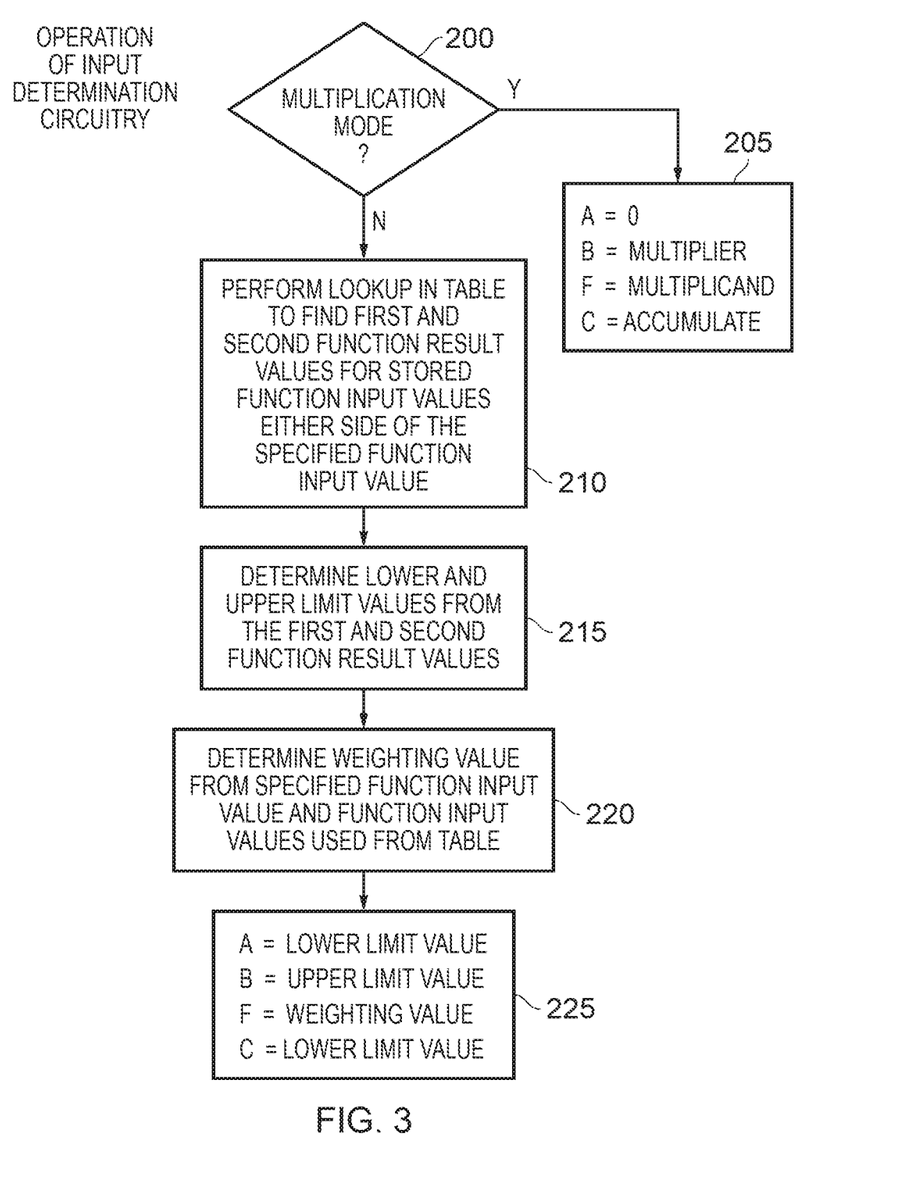
FIG. 3 is a flow diagram illustrating the operation of the input determination circuitry of FIG. 1 in accordance with one example arrangement.

FIG. 3 is a flow diagram illustrating the operation of the input determination circuitry 10 dependent on the mode of operation. At step 200, it is determined whether the apparatus is operating in the multiplication mode, and if so the process proceeds to step 205 where the input A is set equal to zero, the input B is set equal to the multiplier value, the input F is set equal to the multiplicand value, and the input C is set equal to the accumulate value. If no accumulate operation is being performed, and instead a simple multiplication operation is being performed, the input C can be set equal to zero.

However, if it is determined that the apparatus is not in the multiplication mode, and hence is in the linear interpolation mode, then at step 210 the input determination circuitry 10 performs a lookup within the lookup table 40 to find first and second function result values for stored function input values that are either side of the specified function input value provided to the input determination circuitry 10. At step 215, lower and upper limit values are then determined from the first and second function result values retrieved from the lookup table.

Provided the multiplier array is wide enough to accept all of bits of the function result values, then the function results values can be used directly as the lower and upper limit values. However, if the number of bits in each of the first and second function result values exceeds the number of bits available as an input to the multiplier array, then the fractional bits of the first and second function result values are determined, these being all of the bits of the function result values starting from the first more significant bit that differs between the function result values. Hence, purely by way of example, if the first three most significant bits of the first and second function result values are the same, then the fractional bits will be those bits starting from the fourth most significant bit of the first and second function result values. If all of the fractional bits can be accommodated as inputs to the multiplier array, then all of those fractional bits will be input. However, if the number of fractional bits exceeds the width of the multiplier array, then most significant fractional bits will be input the multiplier array, up to the number of bits supported by the multiplier array.

At step 220, the weighting value is determined from the specified function input value and the function input values used from the table. In particular, the weighting value will be derived from a comparison of the difference between the specified function input value and the first stored function input value, and the difference between the specified function input value and the second stored function input value.

Thereafter, as indicated at step 225, the input A is set equal to the lower limit value, the input B is set equal to the upper limit value, the input F is set equal to the weighting value, and the input C is also set equal to the lower limit value.

The following provides an illustration, by way of specific example, as to how the operation of the multiplier array of FIG. 2 produces an interpolation result when the inputs are set as shown at step 225 of FIG. 3. In this example, it will be assumed that the weighting value is 0110. When performing a linear interpolation, the weighting value 0110 is interpreted as meaning that the result required is 6/16×B+10/16×A. The output of rows 0, 1, 2 and 3 of the multiplier array (ignoring for the time being the accumulate input C) will be as follows:

A×1
B×2
B×4
A×8

Whilst the above ignores the accumulate input C, as discussed earlier, when in the interpolation mode of operation the lower limit value is set to the accumulate value, and hence in fact row 0 will produce an output of 2A rather than just A. As a result, the output from the multiplier array will be 10A+6B. This is the correct answer, but sixteen times larger than needed. As discussed earlier, in some implementations no adjustment to the output will be required, since the output will just be interpreted in the appropriate Q number format to take account of the additional number of bits provided in the interpolation result, but if needed the result can be effectively divided by 16 by right shifting the result by 4 bits, in order to produce an interpolation result in the same format as the input values.

Figure 4A:
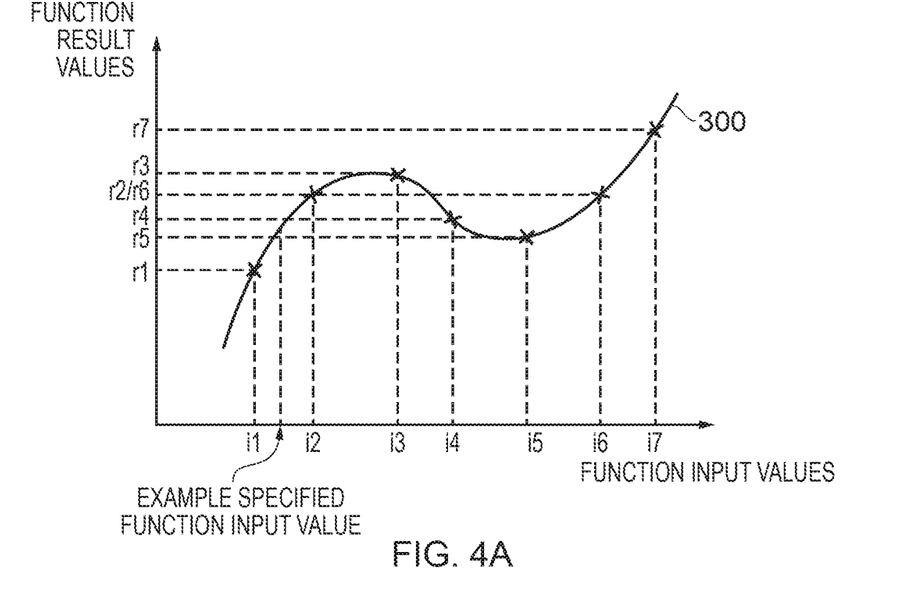
FIG. 4A illustrates a complex function.
Figure 4B:
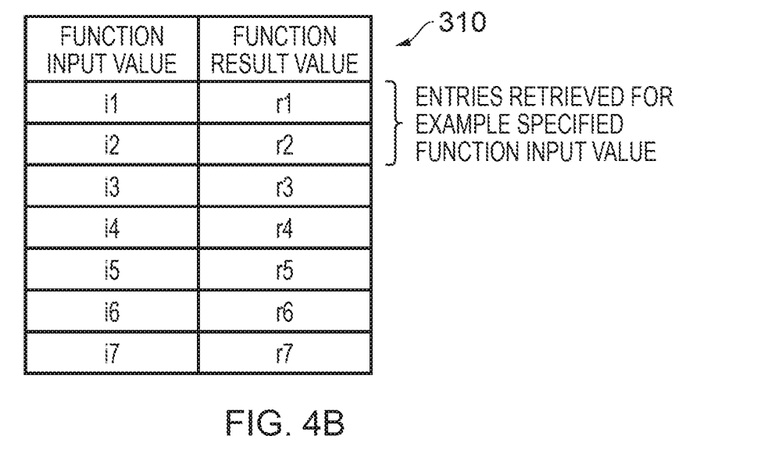
FIG. 4B illustrates an example of lookup table entries that may be provided for reference when seeking to perform a linear interpolation operation to estimate the output value of the complex function for a given input value.

FIGS. 4A and 4B illustrate the use of the lookup table when seeking to use linear interpolation to estimate results of a complex function. As shown in FIG. 4A, the complex function 300 is shown, and the result values are computed for a series of input values. As shown in FIG. 4B, a lookup table 310 can then be populated to identify the series of input values, and the corresponding function result values obtained for the function when the input values are used.

If a specified function input value takes the value shown by way of example in FIG. 4A, i.e. a value between the input values i1 and i2, then the lookup within the lookup table 310 will result in output of the top two entries in the lookup table, providing the results r1 and r2 for the two input values i1 and i2. A linear interpolation between the results r1 and r2 can then be performed based on the difference between the example specified function input value and each of the two input values i1 and i2.

As discussed earlier with reference to FIG. 1, the use of result adjustment circuitry 70 is optional. In some instances it may be considered unnecessary, and instead the hardware may merely interpret the result output from the multiplier array in the appropriate Q number format. This enables maximum precision in the linear interpolation result to be maintained. By way of specific example, if we consider the lower limit and upper limit values to be 4-bit integer values (hence having the Q number format Q 4.0), then the full linear interpolation result output will have eight bits, and be in Q 4.4 format. If the software executing on the system wants the full Q 4.4 format result, then this is being delivered natively by the multiplier array hardware in this scenario. However, if instead it is desired for downstream processing to alter the format of the result, then the result adjustment circuitry 70 can be used to achieve this. For example, it may be that the software will want the output format to be the same as the input format, and this can be achieved by performing a right shift of the output from the multiplier array by the required number of bits (i.e. by four bits in the above example). Alternatively, rather than merely truncating the value in the above manner, a rounding operation could be performed in addition to truncation, so as to take account of the discarded bits within the four retained bits of the result.

Figure 5:
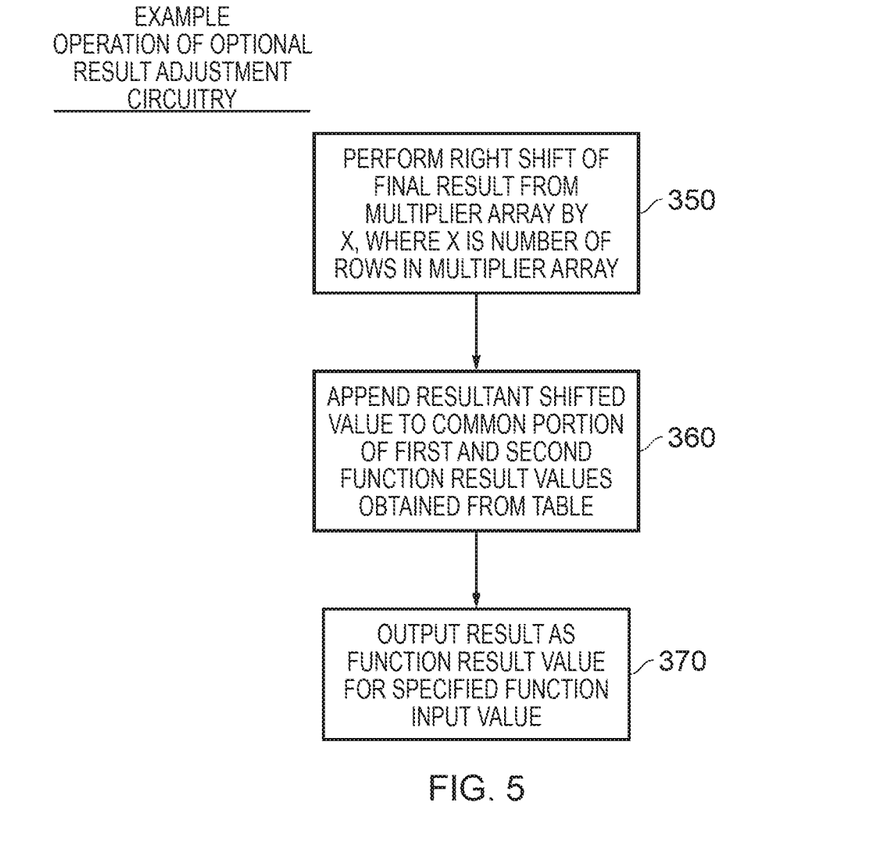
FIG. 5 is a flow diagram illustrating the operation of the optional result adjustment circuitry in one example implementation.

FIG. 5 illustrates a further example where result adjustment may be appropriate, in particular when there may be some common portion of the retrieved function result values output from the lookup table that are not themselves input into the multiplier array as the lower and upper limit input values. As shown in FIG. 5, at step 350, a right shift of the final result from the multiplier array 20 can be performed by a value "x" where x is the number of rows in the multiplier array. As discussed earlier, the number of bits in the weighting value will typically be chosen so that it matches the number of rows in the multiplier array, and accordingly x may also be considered to be the number of bits in the weighting value.

Then, at step 360, the resultant shifted value is appended to the common portion of the first and second function result values obtained from the table, and at step 370 the result is output as the function result value for the specified function input value.

As discussed earlier, when performing a multiplication operation within a multiplier array on two N-bit numbers, then as far as the multiplier array is concerned the two input values are treated as integer values, hence having the Q format Q N.0, and this results in the production of a result in the format Q 2N.0. However, when performing linear interpolation, the second input to the multiplier (in this case the weighting value) is effectively a fraction and hence has the Q format Q 0.N. As a result, the output from the multiplier array is in the Q format Q N.N. As discussed earlier, this result can be used as is, and in fact provides an increased level of precision in the linear interpolation result, or else as discussed earlier shifting can be performed in order to change the representation of the linear interpolation result, for example putting it back into the Q N.0 format of the input values.

Figure 6:
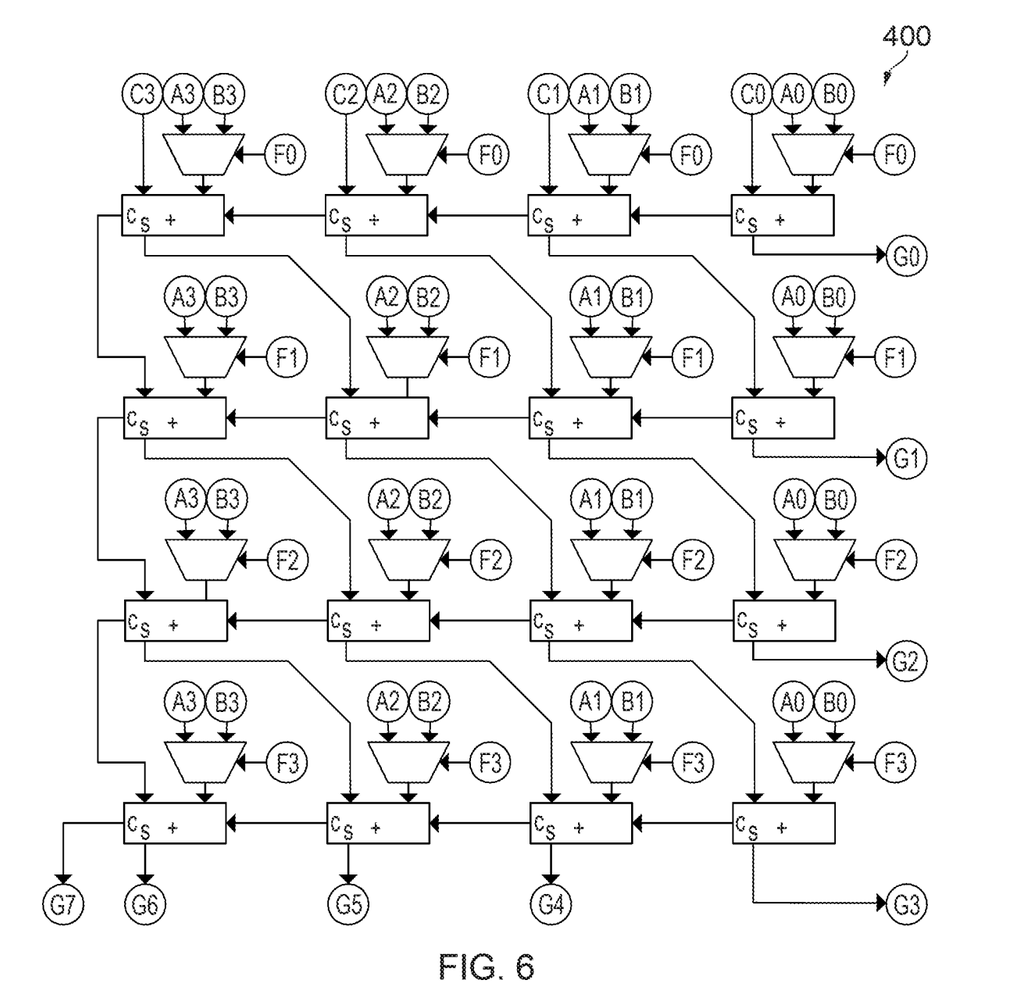
FIG. 6 is a diagram illustrating in more detail components provided within the multiplier array in accordance with one example implementation.

FIG. 6 is a diagram illustrating in more detail the components provided within the multiplier array in the example where the multiplier array has four rows, and each of the input values has four bits. In this case, the multiplier array 400 illustrates the individual multiplexers and adders provided in association with each of the bits. As can be seen, the output from the adders in each row are provided in 1-bit right shifted format to the adders in the next row, with the output from the adder handling the least significant bit being output as a corresponding bit of the final result.

Figure 7A:
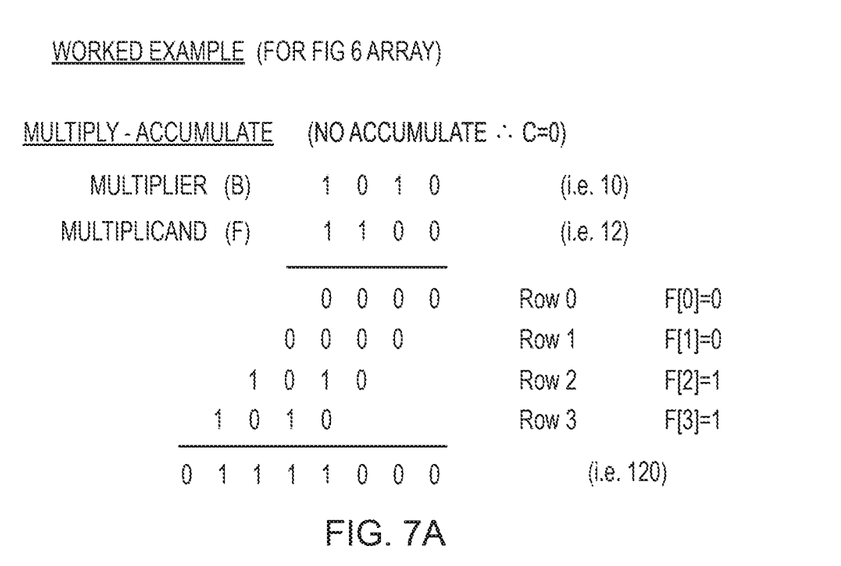
FIGS. 7A and 7B illustrate, by way of specific example, how the multiplier array may be used to perform both multiply-accumulate operations and linear interpolation operations, in accordance with one example implementation.
Figure 7B:
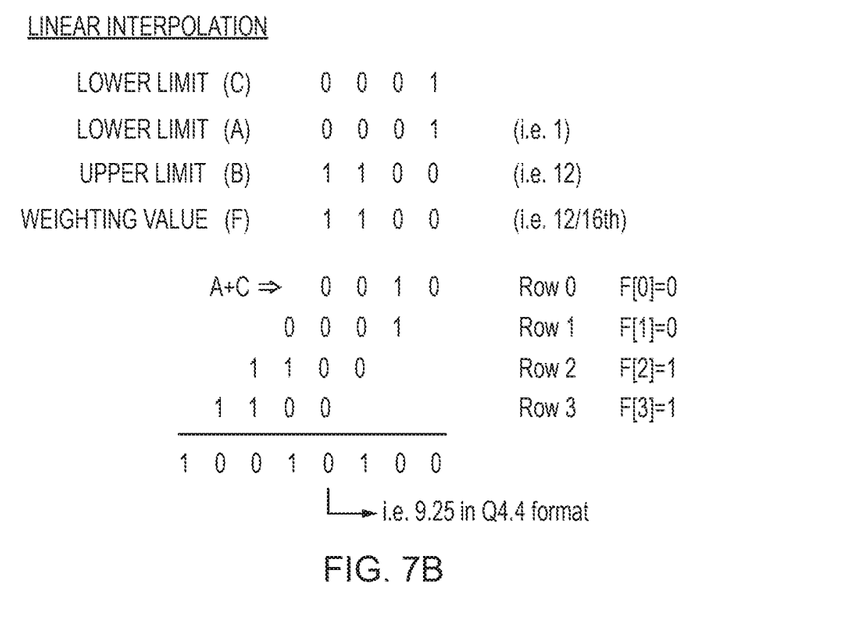

FIGS. 7A and 7B illustrate multiply-accumulate and linear interpolation operations that may be performed using the circuitry of FIG. 6, for specific example input values. Hence, four bit inputs are illustrated, and each of FIGS. 7A and 7B identifies the outputs from the various rows and how they are combined to form the final result. As shown in FIG. 7B, the very first row of the multiplier circuitry 400 takes account of the need to add an additional lower limit term, by setting the lower limit as the accumulate value input to the initial row. As can be seen, the correct linear interpolation result (9.25 in this specific case) is produced, represented in Q4.4 format.

It will be appreciated that the techniques described herein provide a very efficient mechanism for providing linear interpolation support within an apparatus that is already required to have a multiplier array to support multiply-accumulate operations. In particular, the multiplier array can be organised in a way that enables it to be used in two different mode of operations, to support not only multiply-accumulate operations but also linear interpolation operations. This hence provides a particularly low cost and area efficient solution for systems that require linear interpolation support.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware that provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a multiplier array to implement a multiply accumulate operation in order to multiply together a multiplier value and a multiplicand value, and add an accumulate value;
the multiplier array comprising a plurality of rows, each row comprising multiplexer circuitry and adder circuitry, with the multiplexer circuitry being arranged to select, in dependence on a control input, one of a first multiplexer input value and a second multiplexer input value to provide as a first adder input value to the adder circuitry, in each row other than an initial row the adder circuitry further being arranged to receive as a second adder input value at least a portion of a result value produced by the adder circuitry in a preceding row of the multiplier array; and
mode select circuitry to change the mode of operation of the apparatus between a multiplication mode where the multiplier array implements the multiply accumulate operation and a linear interpolation mode where the multiplier array is used to implement a linear interpolation operation between a lower limit input value and an upper limit input value based on a weighting value;
wherein:
when in the multiplication mode, each row of the multiplier array is arranged such that the control input for the multiplexer circuitry of that row is provided by an associated bit of the multiplicand value selected for that row, the first multiplexer input value is set to 0, and the second multiplexer input value is set to the multiplier value;
when in the linear interpolation mode, each row of the multiplier array is arranged such that the control input for the multiplexer circuitry of that row is provided by an associated bit of the weighting value selected for that row, one of the first multiplexer input value and the second multiplexer input value is set to the lower limit input value, and other of the first multiplexer input value and the second multiplexer input value is set to the upper limit input value.

2. An apparatus as claimed in claim 1, wherein:
the multiplier array has an accumulate input that is set to the accumulate value when the mode of operation is the multiplication mode and that is set to the lower limit input value when the mode of operation is the linear interpolation mode.

3. An apparatus as claimed in claim 2, wherein the accumulate input is used as a second adder input value by the adder circuitry in the initial row.

4. An apparatus as claimed in claim 1, wherein the weighting value is expressed relative to the lower limit value, and within each row the first multiplexer input value is set to the lower limit input value, and the second multiplexer input value is set to the upper limit input value.

5. An apparatus as claimed in claim 1, further comprising result adjustment circuitry operable, when the multiplier array is operating in the linear interpolation mode, to perform an adjustment operation on a final result output by the multiplier array in order to produce a linear interpolation result value in a format required for subsequent processing.

6. An apparatus as claimed in claim 5, wherein the adjustment operation comprises performing a computation equivalent to dividing the final result by $2^x$, where x is the number of rows in the multiplier array.

7. An apparatus as claimed in claim 6, wherein the result adjustment circuitry comprises right shift circuitry to right shift the final result by x bits in order to drop the least significant x bits of the final result when producing the linear interpolation result.

8. An apparatus as claimed in claim 1, wherein, when the multiplier array is operating in the multiplication mode, then in each row other than the initial row the operation of the multiplexer circuitry and the adder circuitry implements functionality equivalent to determining whether to add the multiplier value, shifted left by an amount dependent on a row number of that row, to the result value produced by the adder circuitry in the preceding row of the multiplier array, dependent on the associated bit of the multiplicand value selected for that row.

9. An apparatus as claimed in claim 8, wherein for a given row, the function of shifting the multiplier value left by an amount dependent on a row number of that given row is achieved by right shifting the result value produced by the adder circuitry in the preceding row of the multiplier array by one bit, outputting the least significant bit of that result value as a bit of a final result of the multiplier array, and using a remaining portion of the result value as the second adder input value for the adder circuitry of the given row.

10. An apparatus as claimed in claim 1, further comprising:
a lookup table arranged to store, for a given function, a plurality of function input values, and for each function input value a corresponding function result value produced by applying the given function to that function input value; and
input determination circuitry arranged, when in the linear interpolation mode, to perform a lookup within the lookup table based on a specified function input value to determine a first stored function input value lower than the specified function input value and a second stored function input value higher than the specified function input value, and to retrieve from the lookup table corresponding first and second function result values for the first and second stored function input values;
wherein:
the input determination circuitry is arranged to derive the lower limit input value from the first function result value and the upper limit input value from the second function result value; and
the input determination circuitry is arranged to derive the weighting value from a comparison of a difference between the specified function input value and the first stored function input value and a difference between the specified function input value and the second stored function input value.

11. An apparatus as claimed in claim 10, further comprising:
result adjustment circuitry operable, when the multiplier array is operating in the linear interpolation mode, to perform an adjustment operation on a final result output by the multiplier array in order to produce a linear interpolation result value in a format required for subsequent processing; and
the result adjustment circuitry is further arranged to append the linear interpolation result value to a common portion of the first and second function result values in order to produce the corresponding function result value that would be produced by applying the given function to the specified function input value.

12. An apparatus as claimed in claim 1, wherein the weighting value is chosen to have a number of bits equal to the number of rows in the multiplier array.

13. An apparatus as claimed in claim 1, wherein the weighting value is chosen to have a number of bits equal to the number of bits in each of the lower limit input value and the upper limit input value.

14. An apparatus as claimed in claim 1, wherein, within each row, the multiplexer circuitry comprises multiplexer blocks to process individual bits of the first and second multiplexer input values and the adder circuitry comprises adder blocks separate from the multiplexer blocks to process individual bits of the first and second adder input values.

15. An apparatus as claimed in claim 1 wherein:
when in the multiplication mode the multiplier array is arranged to output a final result which is equal to B×F+C, where B is the multiplier value, F is the multiplicand value, and C is the accumulate value;
when in the linear interpolation mode the multiplier array is arranged to output a final result that, when expressed in integer format, is equal to $2^x \times (A \times (2^x - F)/2^x)) + (B \times F/2^x))$, where A is the lower limit input value, B is the upper limit input value, F is the weighting value, and x is the number of rows in the multiplier array.

16. A method for performing linear interpolation within an apparatus, comprising:
providing a multiplier array to implement a multiply accumulate operation in order to multiply together a multiplier value and a multiplicand value, and add an accumulate value;
arranging the multiplier array to comprise a plurality of rows, each row comprising multiplexer circuitry and adder circuitry, with the multiplexer circuitry being arranged to select, in dependence on a control input, one of a first multiplexer input value and a second multiplexer input value to provide as a first adder input value to the adder circuitry, in each row other than an initial row the adder circuitry further being arranged to receive as a second adder input value at least a portion of a result value produced by the adder circuitry in a preceding row of the multiplier array;
changing the mode of operation of the apparatus between a multiplication mode where the multiplier array implements the multiply accumulate operation and a linear interpolation mode where the multiplier array is used to implement a linear interpolation operation between a lower limit input value and an upper limit input value based on a weighting value;
when in the multiplication mode, arranging each row of the multiplier array such that the control input for the multiplexer circuitry of that row is provided by an associated bit of the multiplicand value selected for that row, the first multiplexer input value is set to 0, and the second multiplexer input value is set to the multiplier value; and
when in the linear interpolation mode, arranging each row of the multiplier array such that the control input for the multiplexer circuitry of that row is provided by an associated bit of the weighting value selected for that row, one of the first multiplexer input value and the second multiplexer input value is set to the lower limit input value, and other of the first multiplexer input value and the second multiplexer input value is set to the upper limit input value.

* * * * *